United States Patent
Kanki

(10) Patent No.: US 11,724,573 B2
(45) Date of Patent: Aug. 15, 2023

(54) WINDSHIELD

(71) Applicant: NIPPON SHEET GLASS COMPANY, LIMITED, Tokyo (JP)

(72) Inventor: Satoshi Kanki, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 555 days.

(21) Appl. No.: 16/958,396

(22) PCT Filed: Dec. 26, 2018

(86) PCT No.: PCT/JP2018/047946
§ 371 (c)(1),
(2) Date: Jun. 26, 2020

(87) PCT Pub. No.: WO2019/131800
PCT Pub. Date: Jul. 4, 2019

(65) Prior Publication Data
US 2021/0053423 A1 Feb. 25, 2021

(30) Foreign Application Priority Data
Dec. 28, 2017 (JP) .................................. 2017-253928

(51) Int. Cl.
*B60J 1/00* (2006.01)
*B32B 17/10* (2006.01)
(Continued)

(52) U.S. Cl.
CPC ......... *B60J 1/001* (2013.01); *B32B 17/10036* (2013.01); *B32B 17/10091* (2013.01);
(Continued)

(58) Field of Classification Search
None
See application file for complete search history.

(56) References Cited

U.S. PATENT DOCUMENTS

2016/0250982 A1    9/2016  Fisher et al.
2017/0152171 A1*   6/2017  Schwall ................. C03C 17/02
(Continued)

FOREIGN PATENT DOCUMENTS

EP    3248949 A1     11/2017
JP    2017-105665 A   6/2017
(Continued)

OTHER PUBLICATIONS

International Search Report, issued in PCT/JP2018/047946, dated Mar. 19, 2019. Written Opinion of the International Searching Authoirty, issued in PCT/JP2018/047946, dated Mar. 19, 2019.
(Continued)

*Primary Examiner* — David Sample
(74) *Attorney, Agent, or Firm* — Birch, Stewart, Kolasch & Birch, LLP

(57) ABSTRACT

A windshield according to the present invention includes a first glass plate that includes a first surface and a second surface, a second glass plate that includes a first surface and a second surface and is arranged such that the first surface of the second glass plate faces the second surface of the first glass plate, and an intermediate film that is sandwiched between the first glass plate and the second glass plate. The first glass plate includes a first end portion and a second end portion that is opposite to the first end portion, and a thickness of the first glass plate decreases from the first end portion toward the second end portion. In the first glass plate, a surface compressive stress on the first end portion side is higher than a surface compressive stress on the second end portion side.

10 Claims, 6 Drawing Sheets

(51) Int. Cl.
*B60J 1/02* (2006.01)
*H01Q 1/12* (2006.01)

(52) U.S. Cl.
CPC .. *B32B 17/10348* (2013.01); *B32B 17/10761* (2013.01); *B60J 1/02* (2013.01); *H01Q 1/1271* (2013.01); *B32B 2250/40* (2013.01); *B32B 2605/00* (2013.01)

(56) References Cited

U.S. PATENT DOCUMENTS

| | | |
|---|---|---|
| 2017/0305240 A1 | 10/2017 | Aoki et al. |
| 2017/0334759 A1 | 11/2017 | Yamato et al. |
| 2020/0207655 A1 | 7/2020 | Yamato et al. |

FOREIGN PATENT DOCUMENTS

| | | |
|---|---|---|
| WO | WO 2016/117650 A1 | 7/2016 |
| WO | WO 2016/121559 A1 | 8/2016 |
| WO | WO 2016/138333 A1 | 9/2016 |

OTHER PUBLICATIONS

Written Opinion of the International Searching Authoirty, issued in PCT/JP2018/047946, dated Mar. 19, 2019.
Japanese Notice of Reasons for Refusal for Japanese Application No. 2017-253928, dated Jul. 13, 2021, with an English translation.
Chinese Office Acrtion and Search Report for Chinese Application No. 201880084204.4, dated Jan. 19, 2022, with English translation.
Extended European Search Report for European Application No. 18887007.3 dated Aug. 27, 2021.

* cited by examiner

WINDSHIELD

TECHNICAL FIELD

The present invention relates to a windshield and a method for manufacturing a windshield.

BACKGROUND ART

Windshields that are used with head-up display devices are commonly formed into a wedge shape in order to prevent a double image from occurring. Although there are various methods for forming a windshield into a wedge shape, for example, Patent Literature 1 discloses a windshield that includes an intermediate film and an inner glass plate that have constant thicknesses and an outer glass plate that is formed into a wedge shape.

CITATION LIST

Patent Literature

Patent Literature 1: JP 2017-105665A

SUMMARY OF INVENTION

Technical Problem

However, there is still room for improvement in wedge-shaped glass plates such as that described above, and an improvement in the strength thereof is desired. The present invention was made to solve this issue, and it is an object of the present invention to provide a windshield and a method for manufacturing a windshield with which the strength of a wedge-shaped glass plate can be improved.

Solution to Problem

Aspect 1.
A windshield including:
a first glass plate that includes a first surface and a second surface;
a second glass plate that includes a first surface and a second surface and is arranged such that the first surface of the second glass plate faces the second surface of the first glass plate; and
an intermediate film that is sandwiched between the first glass plate and the second glass plate,
wherein the first glass plate includes a first end portion and a second end portion that is opposite to the first end portion, and a thickness of the first glass plate decreases from the first end portion toward the second end portion, and
in the first glass plate, a surface compressive stress on the second end portion side is higher than a surface compressive stress on the first end portion side.

Aspect 2.
The windshield according to Aspect 1, wherein the second glass plate is constituted by a flat plate that has a substantially constant thickness.

Aspect 3.
The windshield according to Aspect 1 or 2, wherein, in each of the first glass plate and the second glass plate, a concentration of tin oxide contained in the first surface differs from a concentration of tin oxide contained in the second surface,
a surface of the first glass plate that has a lower concentration of tin oxide constitutes the second surface, and a surface of the second glass plate that has a lower concentration of tin oxide constitutes the first surface.

Aspect 4.
The windshield according to any one of Aspects 1 to 3, wherein at least one of a shield layer and an antenna is layered on the second surface of the second glass plate.

Aspect 5.
The windshield according to any one of claims 1 to 4, wherein lines are formed on the first glass plate, and
lines that are orthogonal to the lines on the first glass plate are formed on the second glass plate.

Aspect 6.
The windshield according to Aspect 1 or 2, wherein, in each of the first glass plate and the second glass plate, a concentration of tin oxide contained in the first surface differs from a concentration of tin oxide contained in the second surface,
a surface of the first glass plate that has a lower concentration of tin oxide constitutes the second surface, and
a surface of the second glass plate that has a higher concentration of tin oxide constitutes the first surface.

Aspect 7.
The windshield according to Aspect 1, wherein the second glass plate includes a first end portion and a second end portion that respectively correspond to the first end portion and the second end portion of the first glass plate, and
a thickness of the second glass plate decreases from the first end portion toward the second end portion.

Aspect 8.
The windshield according to any one of Aspects 1 to 7, wherein the first glass plate is not subjected to air-quench tempering.

Aspect 9.
A method for manufacturing a windshield including:
forming a first glass plate that has a curved shape and includes a first end portion and a second end portion that is opposite to the first end portion, a thickness of the first glass plate decreasing from the first end portion toward the second end portion;
forming a second glass plate that has a curved shape; and
arranging an intermediate film between a second surface of the first glass plate and a first surface of the second glass plate and applying a pressure to form the glass plates and the intermediate film into a single piece,
wherein, in the forming of the first glass plate, the first glass plate is formed into the curved shape after being heated such that the second end portion side has a higher temperature than the first end portion side.

Aspect 10.
A method for manufacturing a windshield including:
forming a first glass plate that has a curved shape and includes a first end portion and a second end portion that is opposite to the first end portion, a thickness of the first glass plate decreasing from the first end portion toward the second end portion;
forming a second glass plate that has a curved shape; and
arranging an intermediate film between a second surface of the first glass plate and a first surface of the second glass plate and applying a pressure to form the glass plates and the intermediate film into a single piece,
wherein, in the forming of the first glass plate, air-quench tempering is performed on the second end portion side.

Advantageous Effects of Invention

According to the present invention, the strength of a wedge-shaped glass plate can be improved.

DESCRIPTION OF EMBODIMENTS

1. Summary of Windshield

The following describes one embodiment of a windshield for an automobile according to the present invention with reference to the drawings. The windshield according to the present embodiment is used for displaying information by projecting light emitted from a head-up display device.

Figure 1:
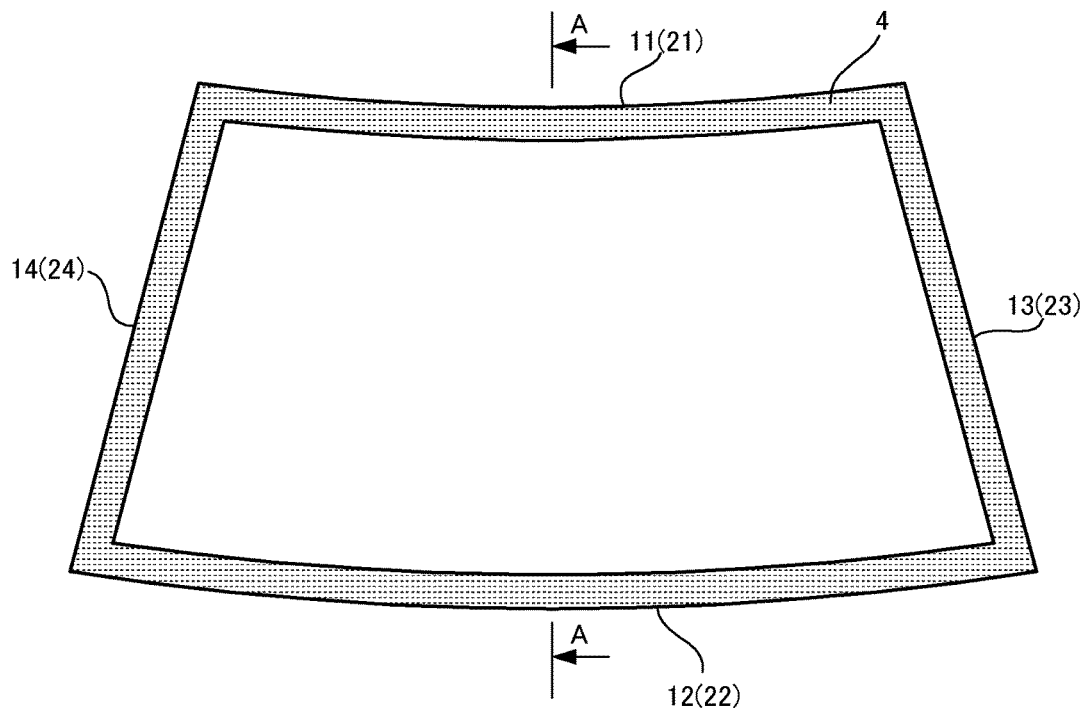
FIG. 1 is a front view showing one embodiment of a windshield according to the present invention.
Figure 2:
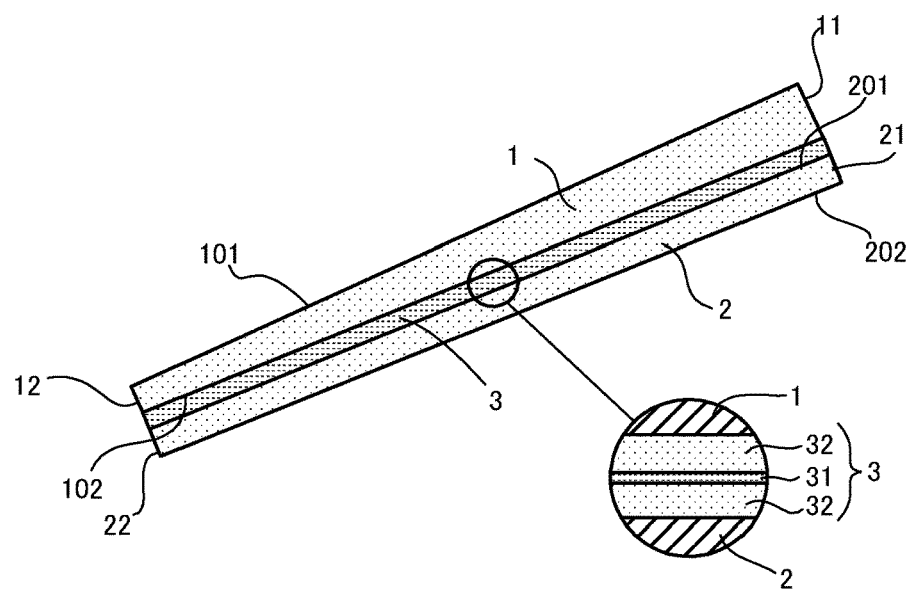
FIG. 2 is a cross-sectional view taken along line A-A in FIG. 1.

FIG. 1 is a front view of the windshield according to the present embodiment and FIG. 2 is a cross-sectional view taken along line A-A in FIG. 1. As shown in FIGS. 1 and 2, the windshield according to the present embodiment includes an outer glass plate 1, an inner glass plate 2, and an intermediate film 3 that is arranged between these glass plates 1 and 2. Further, a shield layer 4 is layered on the windshield. The following describes respective members.

2. Outer Glass Plate and Inner Glass Plate

First, the outer glass plate 1 and the inner glass plate 2 will be described. Known glass plates can be used as the outer glass plate 1 and the inner glass plate 2, and these glass plates can be made of heat-ray absorbing glass, regular clear glass, green glass, or UV green glass. However, the glass plates 1 and 2 need to realize visible light transmittance that conforms to the safety standards of the country in which the automobile is to be used. For example, adjustments can be made so that the outer glass plate 1 ensures a required solar absorptance and the inner glass plate 2 provides visible light transmittance that meets safety standards. The following shows one example of clear glass, heat-ray absorbing glass, and soda lime-based glass.

| Clear glass |
| --- |
| $SiO_2$: 70 to 73 mass % |
| $Al_2O_3$: 0.6 to 2.4 mass % |
| CaO: 7 to 12 mass % |
| MgO: 1.0 to 4.5 mass % |
| $R_2O$: 13 to 15 mass % (R is an alkali metal) |
| Total iron oxide (T-$Fe_2O_3$) in terms of $Fe_2O_3$: 0.08 to 0.14 mass % |

Heat-Ray Absorbing Glass

With regard to the composition of heat-ray absorbing glass, a composition obtained, which is based on the composition of clear glass, by setting the ratio of the total iron oxide (T-$Fe_2O_3$) in terms of $Fe_2O_3$ to 0.4 to 1.3 mass %, the ratio of $CeO_2$ to 0 to 2 mass %, and the ratio of $TiO_2$ to 0 to 0.5 mass %, and reducing the components (mainly $SiO_2$ and $Al_2O_3$) forming the framework of glass by an amount corresponding to the increases in T-$Fe_2O_3$, $CeO_2$, and $TiO_2$ can be used, for example.

| Soda lime-based glass |
| --- |
| $SiO_2$: 65 to 80 mass % |
| $Al_2O_3$: 0 to 5 mass % |
| CaO: 5 to 15 mass % |
| MgO: at least 2 mass % |
| NaO: 10 to 18 mass % |
| $K_2O$: 0 to 5 mass % |
| MgO + CaO: 5 to 15 mass % |
| $Na_2O$ + $K_2O$: 10 to 20 mass % |
| $SO_3$: 0.05 to 0.3 mass % |
| $B_2O_3$: 0 to 5 mass % |
| Total iron oxide (T-$Fe_2O_3$) in terms of $Fe_2O_3$: 0.02 to 0.03 mass % |

The outer glass plate 1 is formed into a trapezoidal shape and includes an upper side (first end portion) 11, a lower side (second end portion) 12, a right side 13, and a left side 14. Also, the outer glass plate includes a first surface 101 that faces the vehicle exterior side, a second surface 102 that faces the vehicle interior side, and an edge surface that connects the first surface and the second surface. The outer glass plate 1 is formed into a wedge shape such that the thickness decreases from the upper side 11 toward the lower side 12. Similarly, the inner glass plate 2 is formed into a trapezoidal shape and includes an upper side 21, a lower side 22, a right side 23, and a left side 24. The inner glass plate also includes a first surface 201 that faces the vehicle exterior side, a second surface 202 that faces the vehicle interior side, and an edge surface that connects the first surface 201 and the second surface 202. Unlike the outer glass plate 1, the inner glass plate 2 is constituted by a flat plate that has a constant thickness.

The above-described intermediate film 3 is arranged between the second surface 102 of the outer glass plate 1 and the first surface 201 of the inner glass plate 2.

Although there is no particular limitation on the thickness of the windshield according to the present embodiment, the total thickness of the outer glass plate 1 and the inner glass plate 2 is preferably set to 2.4 to 5.0 mm, more preferably 2.6 to 4.6 mm, and particularly preferably 2.7 to 3.2 mm, from the viewpoint of weight reduction. As described above, it is necessary to reduce the total thickness of the outer glass plate 1 and the inner glass plate 2 in order to reduce the weight, and therefore, although there is no particular limitation on the thicknesses of the outer glass plate 1 and the inner glass plate 2, the thicknesses of these glass plates 1 and 2 can be determined as described below, for example. Note that the thicknesses of the glass plates 1 and 2 can be measured using a micrometer.

Durability against external damage and impact resistance are mainly required for the outer glass plate 1, and impact resistance against flying objects such as small stones is required. On the other hand, the weight increases as the thickness increases, which is not preferable. From this viewpoint, the thickness of the outer glass plate 1 is preferably 1.8 to 2.3 mm, and more preferably 1.9 to 2.1 mm. It is possible to determine the thickness to employ according to the use of the glass. However, the upper side 11 is thicker than the lower side 12, and accordingly, the thickness of the upper side 11 can be set to 2.5 to 5.0 mm, the thickness of the lower side 12 can be set to 2.6 to 6.7 mm, and a difference in thickness between the upper side 11 and the lower side 12 can be set to 0.1 to 1.7 mm, for example.

The thickness of the inner glass plate 2 can be made equal to the thickness of the outer glass plate 1, but in order to reduce the weight of the windshield, for example, the thickness of the inner glass plate 2 can be made smaller than that of the outer glass plate 1. Specifically, when the strength of the glass is taken into consideration, the thickness is preferably 0.6 to 2.3 mm, more preferably 0.8 to 2.0 mm, and particularly preferably 1.0 to 1.4 mm. The thickness is yet more preferably 0.8 to 1.3 mm. For the inner glass plate 2 as well, it is possible to determine the thickness to employ according to the use of the glass.

The outer glass plate 1 and the inner glass plate 2 according to the present embodiment have curved shapes. It is supposed that, if the windshield has a curved shape, the larger the depth of bend is, the lower the sound insulation performance is. The depth of bend is an amount indicating the bend of the windshield, and when a straight line connecting the center of the upper side 11 and the center of the lower side 12 of the windshield is set, for example, the greatest distance between this straight line and the windshield is defined as the depth of bend.

Here, one example of a method for measuring the thickness of the windshield 1 will be described. First, with respect to the measurement position, the measurement is performed at two positions: an upper position and a lower position on a center line extending in the up-down direction at the center of the windshield in the left-right direction. Although there is no particular limitation on the measurement device, a thickness gauge such as SM-112 manufactured by TECLOCK Co., Ltd. can be used, for example. During measurement, the windshield is arranged such that its curved surface is placed on a flat surface, and an end portion of the windshield is sandwiched and measured with the above-described thickness gauge.

3. Method for Manufacturing Outer Glass Plate and Inner Glass Plate

Next, one example of a method for manufacturing the outer glass plate 1 and the inner glass plate 2 will be described with reference to FIG. 3. In one example, float glass plates manufactured using a float method can be used as the outer glass plate 1 and the inner glass plate 2.

Figure 3:
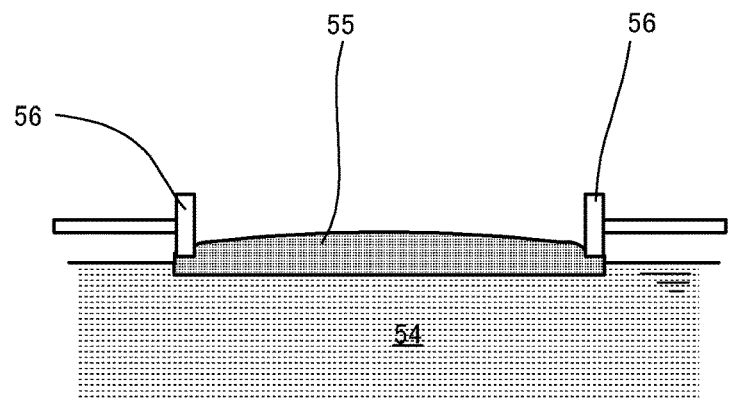
FIG. 3 is a diagram showing one example of a method for manufacturing a float glass plate.
Figure 4:
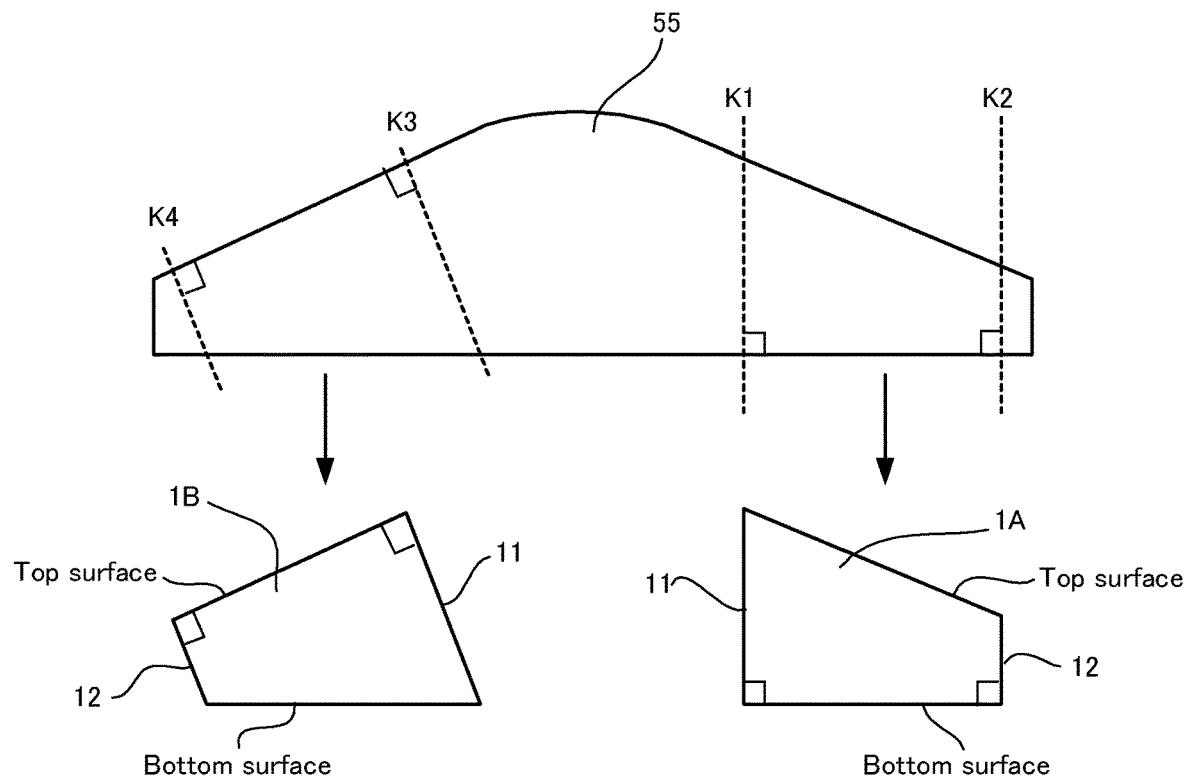
FIG. 4 is a cross-sectional view showing a method for cutting out a glass plate.

FIG. 3 is a diagram showing a method for manufacturing a float glass plate. The direction perpendicular to the sheet face of FIG. 3 is a flow direction of molten glass 55 and the left-right direction is the width direction of the molten glass 55. In FIG. 4, a variation in the thickness of the molten glass 55 is exaggerated.

In the float method, molten glass 55 is continuously supplied onto molten metal 54 such as molten tin and the supplied molten glass 55 is caused to flow on the molten metal 54 to form the molten glass 55 into a band plate shape. The thus formed glass is called a glass ribbon 55.

In order to suppress contraction of the glass ribbon 55 in the width direction, both end portions of the glass ribbon 55 in the width direction are pressed by a pair of rollers 56. A plurality of pairs of rollers 56 are provided with a distance therebetween in the flow direction of the glass ribbon 55. As a result of the plurality of pairs of rollers 16 rotating, the glass ribbon 55 moves downstream.

The glass ribbon 55 is cooled as it moves downstream, and is lifted up from the molten metal 54 after it is cooled and solidified. The glass ribbon 55 is annealed and then cut. Thus, a float glass plate is obtained. Here, a surface of the float glass plate that has been in contact with the molten metal 54 will be referred to as a bottom surface and a surface that is opposite to the bottom surface will be referred to as a top surface. The bottom surface and the top surface may be unpolished. Note that the bottom surface has been in contact with the molten metal 54, and accordingly, if the molten metal 54 is tin, a concentration of tin oxide contained in the bottom surface is larger than a concentration of tin oxide contained in the top surface.

In FIG. 3, the thickness of the glass ribbon 55 increases from both end portions in the width direction toward a center portion, as a result of the glass ribbon 55 being pulled in the width direction by the pair of rollers 56. As a result of the thus formed glass ribbon 55 being solidified and then cut, the outer glass plate 1 is obtained. At this time, there are two methods for cutting out the outer glass plate, as shown in FIG. 4. In one method, the glass ribbon 55 is cut such that cut surfaces K1 and K2 extend in the vertical direction as shown on the right side in FIG. 4. These cut surfaces K1 and K2 extend parallel to each other and in the thus obtained outer glass plate 1A, the cut surfaces K1 and K2 are orthogonal to the bottom surface. In the other method, the glass ribbon 55 is cut such that cut surfaces K3 and K4 that are perpendicular to the top surface are formed as shown on the left side in FIG. 4. These cut surfaces K3 and K4 extend parallel to each other and in thus obtained outer glass plate 1B, the cut surfaces K3 and K4 are orthogonal to the top surface. Which cutting method is employed depends on the performance required for the windshield to be obtained, as described later. Regardless of which method is employed, the outer glass plate 1 in which the thickness is increased on the upper side 11 and reduced on the lower side 12 is cut out.

On the other hand, the inner glass plate 2 is formed using the float method similarly to the outer glass plate 1, but the thickness of the inner glass plate 2 is made substantially constant using a known method.

Figure 5:
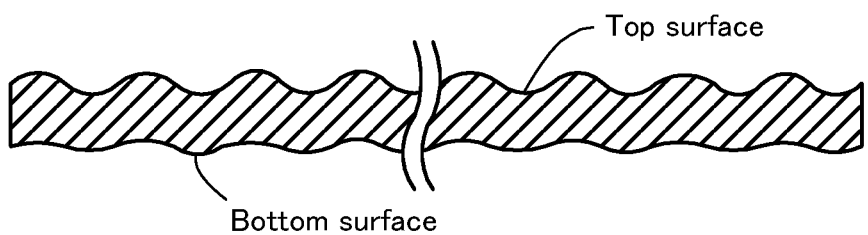
FIG. 5 is a cross-sectional view of a float glass plate.

Since the glass ribbon 55 flows on the molten metal 54, a plurality of lines that extend in the flow direction are formed on a surface of the glass ribbon 55. These lines are also formed on a surface of the cooled float glass plate. As shown in FIG. 5, wave-shaped irregularities are formed with the lines on a surface of the inner glass plate 2 in the direction of the lines. Note that similarly to FIG. 3, FIG. 5 shows a cross section that is orthogonal to the flow direction of the glass plate. Similar irregularities are also formed on the outer glass plate 1. However, in each of the glass plates 1 and 2, irregularities of the bottom surface that has been in contact with the molten metal 54 are smaller than irregularities of the top surface. Here, irregularities being small means that a difference between the deepest portion and the highest portion of the irregularities is small. Also, in addition to the above-described lines, waves that extend in a direction orthogonal to the lines are also formed on the surface of the glass plate formed using the float method. The pitch between these waves is larger than the pitch between the lines, and the waves are smaller than the irregularities formed by the lines.

Figure 6:
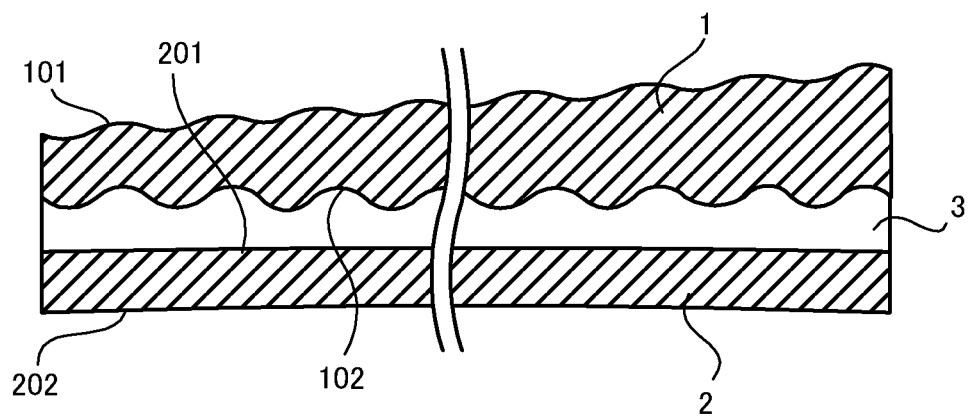
FIG. 6 is a cross-sectional view of the windshield shown in FIG. 1.

As shown in FIG. 6, in the windshield according to the present embodiment, the second surface 102 of the outer glass plate 1 and the first surface 201 of the inner glass plate 2 are constituted by top surfaces. In this configuration, the first surface 101 of the outer glass plate 1 and the second surface 202 of the inner glass plate 2, i.e., both surfaces of the windshield that face the outside have small irregularities. As a result of both surfaces of the windshield facing the outside having small irregularities, perspective distortion can be suppressed.

Figure 7:
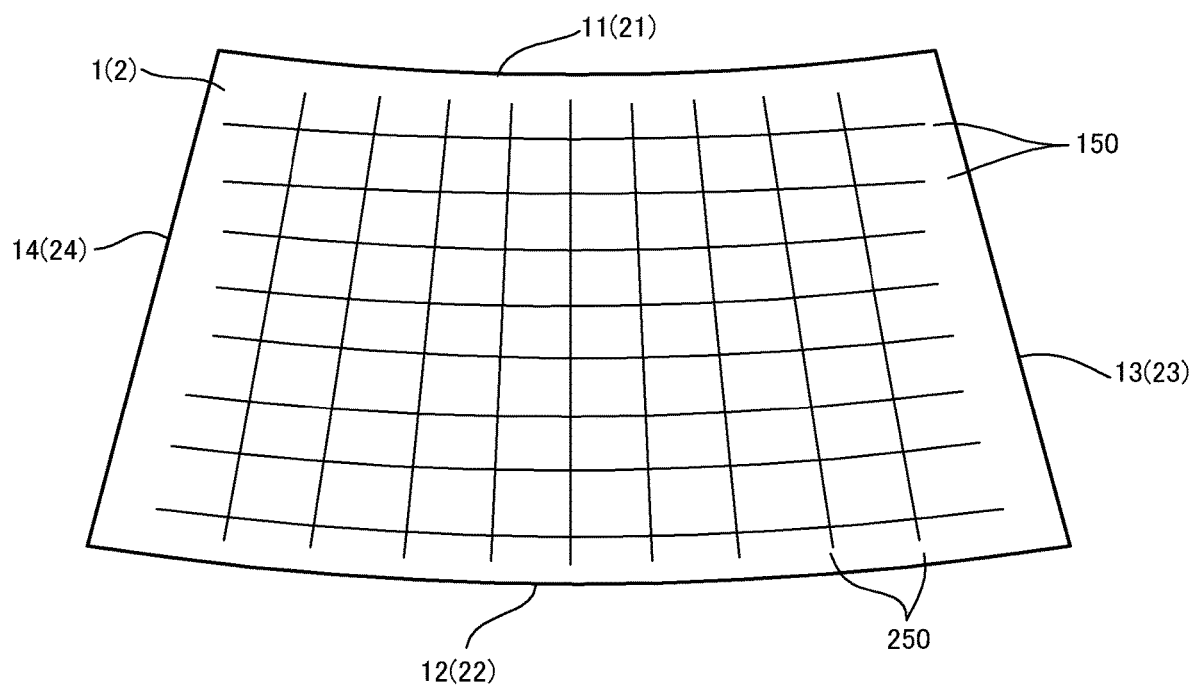
FIG. 7 is a front view showing lines on the windshield shown in FIG. 1.

Also, in the present embodiment, lines on the outer glass plate 1 are orthogonal to lines on the inner glass plate 2 as shown in FIG. 7. That is, according to the above-described method, lines 150 on the outer glass plate 1 extend parallel to the upper side 11 and the lower side 12. On the other hand, the direction of lines 250 on the inner glass plate 2 can be adjusted because the inner glass plate 2 has a constant thickness, and therefore the inner glass plate 2 is cut out from the glass ribbon such that the lines 250 extend from the upper side 21 toward the lower side 22. Thus, the windshield is formed such that the lines 150 on the outer glass plate 1 are orthogonal to the lines 250 on the inner glass plate 2.

Note that in the manufacture of the outer glass plate 1, the thickness can be increased from both end portions in the width direction toward the center portion or from one end portion toward the other end portion in the width direction, by adjusting forming conditions. The thickness of such a glass ribbon 55 can be adjusted by adjusting the pulling force applied by the rollers 56, the peripheral speed of the rollers 56, and the like.

4. Intermediate Film

The intermediate film 3 has a substantially constant thickness and is constituted by at least one layer. In one example, the intermediate film 3 can be constituted by three layers, i.e., a soft core layer 31 and outer layers 32 that are harder than the core layer 31 and between which the core layer 31 is sandwiched as shown in the enlarged view of FIG. 2. However, the intermediate film is not limited to this configuration, and may be constituted by a plurality of layers including the core layer 31 and at least one outer layer 32 that is arranged on the outer glass plate 1 side. For example, the intermediate film 3 may be constituted by two layers, i.e., the core layer 31 and one outer layer 32 arranged on the outer glass plate 1 side. Alternatively, the intermediate film 3 may be configured by arranging an even number of outer layers 32 on each side of the core layer 31 so that the core layer 31 is located at the center. Alternatively, the intermediate film 3 may be configured by arranging an odd number of outer layers 32 on one side of the core layer 31 and arranging an even number of outer layers 32 on the other side so that the core layer 31 is sandwiched therebetween. Note that in the case where only one outer layer 32 is provided, the outer layer 32 is provided on the outer glass plate 1 side as described above, which is for the purpose of enhancing the breakage resistance performance with respect to an external force from the outside of a vehicle or a building. Moreover, when the number of outer layers 32 is increased, the sound insulation performance is improved.

There is no particular limitation on the hardness of the core layer 31 as long as the core layer 31 is softer than the outer layers 32. Although there is no particular limitation on the materials constituting the layers 31 and 32, the outer layers 32 can be made of a polyvinyl butyral resin (PVB), for example. Polyvinyl butyral resin has good adhesion to the glass plates and good penetration resistance and is thus preferable. On the other hand, the core layer 31 can be made of an ethylene vinyl acetate resin (EVA) or a polyvinyl acetal resin, which is softer than the polyvinyl butyral resin that constitutes the outer layers. When the soft core layer is sandwiched between the outer layers, the sound insulation performance can be significantly improved while maintaining the adhesion and the penetration resistance that are equivalent to those of a single-layered resin intermediate film.

Generally, the hardness of a polyvinyl acetal resin can be controlled by adjusting (a) the degree of polymerization of a polyvinyl alcohol, which is the starting material, (b) the degree of acetalization, (c) the type of plasticizer, (d) the ratio of the plasticizer to be added, and the like. Accordingly, a hard polyvinyl butyral resin that is used for the outer layers 32 and a soft polyvinyl butyral resin that is used for the core layer 31 can be produced using the same polyvinyl butyral resin by appropriately adjusting at least one condition selected from the aforementioned conditions. Furthermore, the hardness of a polyvinyl acetal resin can also be controlled based on the type of aldehyde that is used for acetalization and whether co-acetalization using a plurality of types of aldehydes or pure acetalization using a single type of aldehyde is performed. Although not necessarily applicable to every case, the larger the number of carbon atoms of the aldehyde that is used to obtain a polyvinyl acetal resin is, the softer the resulting polyvinyl acetal resin tends to be. Accordingly, for example, if the outer layers 32 are made of a polyvinyl butyral resin, a polyvinyl acetal resin that is obtained by acetalizing an aldehyde having 5 or more carbon atoms (e.g., n-hexyl aldehyde, 2-ethylbutyl aldehyde, n-heptyl aldehyde, or n-octyl aldehyde) with polyvinyl alcohol can be used for the core layer 31. Note that there is no limitation to the above-described resins and the like as long as predetermined Young's moduli can be obtained.

The total thickness of the intermediate film 3 is not particularly specified, but is preferably 0.3 to 6.0 mm, more preferably 0.5 to 4.0 mm, and particularly preferably 0.6 to 2.0 mm. The thickness of the core layer 31 is preferably 0.1 to 2.0 mm and more preferably 0.1 to 0.6 mm. On the other hand, the thickness of each outer layer 32 is preferably 0.1 to 2.0 mm and more preferably 0.1 to 1.0 mm. It is also possible to fix the total thickness of the intermediate film 3 and adjust the thickness of the core layer 31 within the fixed total thickness.

The thicknesses of the core layer 31 and the outer layer 32 can be measured as described below, for example. First, a cross section of the windshield is enlarged by a factor of 175 and displayed using a microscope (e.g., VH-5500 manufactured by Keyence Corporation). Then, the thicknesses of the core layer 31 and the outer layer 32 are visually identified and measured. At this time, in order to eliminate variations seen in visual identification, the measurement is performed five times, and an average value is taken as the thickness of the core layer 31 or the outer layer 32.

The total thickness of the intermediate film 3 is not particularly specified, but is preferably 0.3 to 6.0 mm, more preferably 0.5 to 4.0 mm, and particularly preferably 0.6 to 2.0 mm. The thickness of the core layer 31 is preferably 0.1 to 2.0 mm and more preferably 0.1 to 0.6 mm. On the other hand, the thickness of each outer layer 32 is preferably larger than the thickness of the core layer 31, specifically, preferably 0.1 to 2.0 mm and more preferably 0.1 to 1.0 mm. It is also possible to fix the total thickness of the intermediate film 3 and adjust the thickness of the core layer 31 within the fixed total thickness.

The thicknesses of the core layer 31 and the outer layer 32 can be measured as described below, for example. First, a cross section of the windshield is enlarged by a factor of 175 and displayed using a microscope (e.g., VH-5500 manufactured by Keyence Corporation). Then, the thicknesses of the core layer 31 and the outer layer 32 are visually identified and measured. At this time, in order to eliminate variations seen in visual identification, the measurement is performed five times, and an average value is taken as the thickness of the core layer 31 or the outer layer 32. For example, an enlarged photograph of the windshield is taken, and the core layer and the outer layers 32 are identified in the enlarged photograph to measure the thicknesses thereof.

Although there is no particular limitation on the method for manufacturing the intermediate film 3, examples thereof include a method in which a resin component, such as the above-described polyvinyl acetal resin, a plasticizer, and other additives, if necessary, are mixed and uniformly kneaded, and then the layers are collectively extruded, and a method in which two or more resin films that are produced using this method are laminated using a pressing process, a lamination process, or the like. In the method for laminating using the pressing process, the lamination process, or the like, each of the resin films before laminating may have a single-layer structure or a multilayer structure. The intermediate film 3 may be constituted by a single layer rather than the plurality of layers described above.

5. Shield Layer

As shown in FIG. 1, the shield layer 2 that is formed using ceramic of a dark color such as black is layered on a peripheral edge of the windshield. The shield layer 4 blocks the view from the inside or the outside of the vehicle and is layered along four sides of the windshield.

Various configurations can be employed for the shield layer 4, for example, the shield layer 4 can be provided only on an inner surface of the outer glass plate 1 or an inner surface of the inner glass plate 2, or can be provided on both the inner surface of the outer glass plate 1 and the inner surface of the inner glass plate 2. Although the shield layer 4 can be formed using ceramic and various materials, the shield layer can have the following composition, for example.

TABLE 1

|  |  | First and second colored ceramic paste |
|---|---|---|
| Pigment *1 | mass % | 20 |
| Resin (cellulose resin) | mass % | 10 |
| Organic solvent (pine oil) | mass % | 10 |
| Glass binder *2 | mass % | 65 |
| Viscosity | dPs | 150 |

*1 Main components: copper oxide, chromium oxide, iron oxide, and manganese oxide
*2 Main components: bismuth borosilicate and zinc borosilicate Although a ceramic layer can be formed using a screen printing process, the layer can alternatively be produced by transferring a transfer film for firing to the glass plate and firing it. If screen printing is employed, the ceramic layer can be formed under the conditions that a polyester screen of 355 mesh is used, the coating thickness is 20 μm, the tension is 20 Nm, the squeegee hardness is 80 degrees, the attachment angle is 75°, and the printing speed is 300 mm/s, and performing drying in a drying furnace at 150° C. for 10 minutes, for example.

Figure 8:
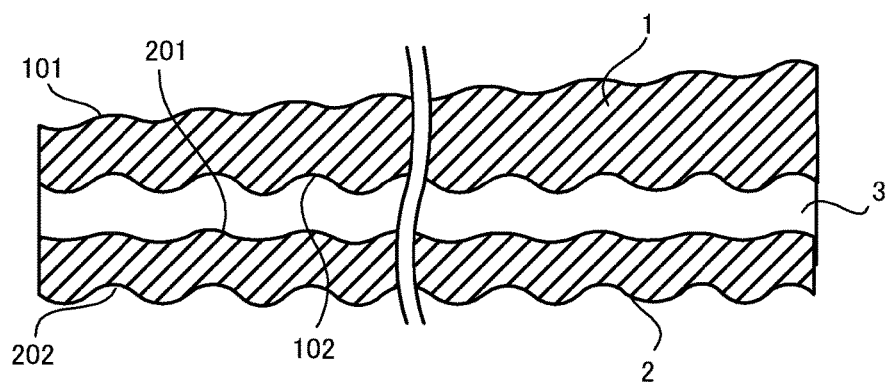
FIG. 8 is another example of a cross-sectional view of the windshield shown in FIG. 1.

Note that ceramic easily adheres to the bottom surface of the above-described glass ribbon 55. This is because the bottom surface has a high concentration of tin oxide. Therefore, if the shield layer 4 is formed using ceramic, the shield layer 4 is preferably formed on the bottom surface. Accordingly, if a windshield such as that shown in FIG. 6 is formed, for example, the shield layer 4 can be formed on the second surface 202 of the inner glass plate 2. Alternatively, as shown in FIG. 8, a configuration is also possible in which the first surface 201 of the inner glass plate 2 is the bottom surface and the shield layer 4 is layered on the first surface 201. However, FIG. 8 shows an example in which lines on the glass plates 1 and 2 are arranged in parallel, for the sake of convenience of description. Note that the shield layer 4 can also be formed by attaching a shield film made of resin of a black color, as well as by laminating ceramic.

6. Method for Manufacturing Windshield

Next, a method for manufacturing the windshield will be described. First, a manufacturing line of the glass plates will be described.

Figure 9:
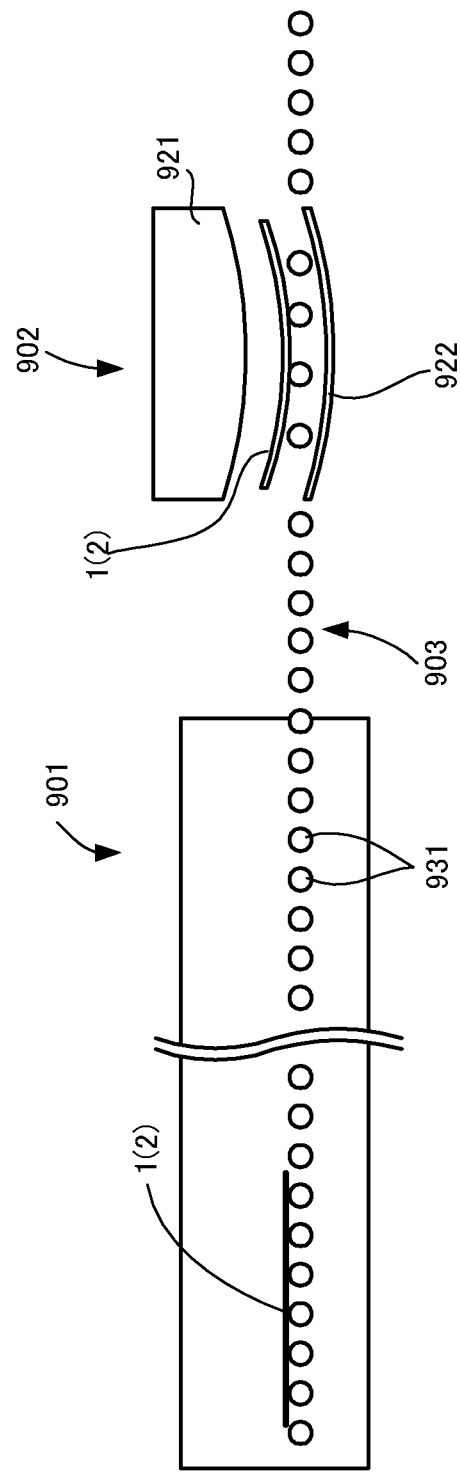
FIG. 9 is a schematic diagram showing a molding device for a glass plate.

As shown in FIG. 9, the manufacturing line includes a heating furnace 901 and a molding device 902 that are arranged in this order from upstream to downstream. Further, a roller conveyor 903 is arranged so as to run from the heating furnace 901, the molding device 902, and to the downstream side thereof, and the glass plate 1 or 2 that is to be processed is conveyed by the roller conveyor 903. The glass plate 1 or 2 has the shape of a flat plate before it is conveyed into the heating furnace 901, and is conveyed into the heating furnace 901 after the above-described shield layer 4 has been layered on the glass plate 1 or 2.

Although the heating furnace 901 may have various configurations, the heating furnace can be an electric heating furnace, for example. The heating furnace 901 includes a furnace main body in the shape of a square tube that is open at the upstream and downstream end portions, and the roller conveyor 903 is arranged therein so as to run from upstream to downstream. Heaters (not shown) are respectively arranged on an upper surface, a lower surface, and a pair of side surfaces of the inner wall of the furnace main body, and heat the glass plate 10 that passes through the heating furnace 901, to a temperature at which molding can be performed, for example, approximate to the softening point of the glass.

The molding device 902 is configured to press the glass plate 1 or 2 between an upper mold 921 and a lower mold 922 to mold the glass plate into a predetermined shape. The upper mold 921 has a curved surface that protrudes downward and covers the entire upper surface of the glass plate 1 or 2, and is configured to be movable up and down. The lower mold 922 has the shape of a frame that conforms to the peripheral portion of the glass plate 1 or 2, and includes an upper surface that is curved to conform to the upper mold 921. With this configuration, the glass plate 1 or 2 is press-molded between the upper mold 921 and the lower mold 922 into a final curved shape. The roller conveyor 903 is arranged inside the frame of the lower mold 922, and the roller conveyor 903 is movable up and down and runs through the frame of the lower mold 922. Further, an annealing device (not shown) is arranged downstream of the molding device 902 to cool the molded glass plate, though this is not shown.

The above-described roller conveyor 903 is well known and includes a plurality of rollers 931 that are rotatably supported at both end potions and are arranged at predetermined intervals. Although the rollers 931 can be driven by various methods, for example, a sprocket is attached to an end portion of each roller 931 and a chain is wound around the sprockets to drive the rollers. The conveyance speed of the glass plate 10 can be adjusted by adjusting the rotation speed of the rollers 931. Note that the lower mold 922 of the molding device 902 may come into contact with the entire surface of the glass plate 1 or 2. Configurations of the upper mold and the lower mold are not particularly limited and any other configurations may be employed as long as the molding device 902 can mold the glass plate.

Figure 10:
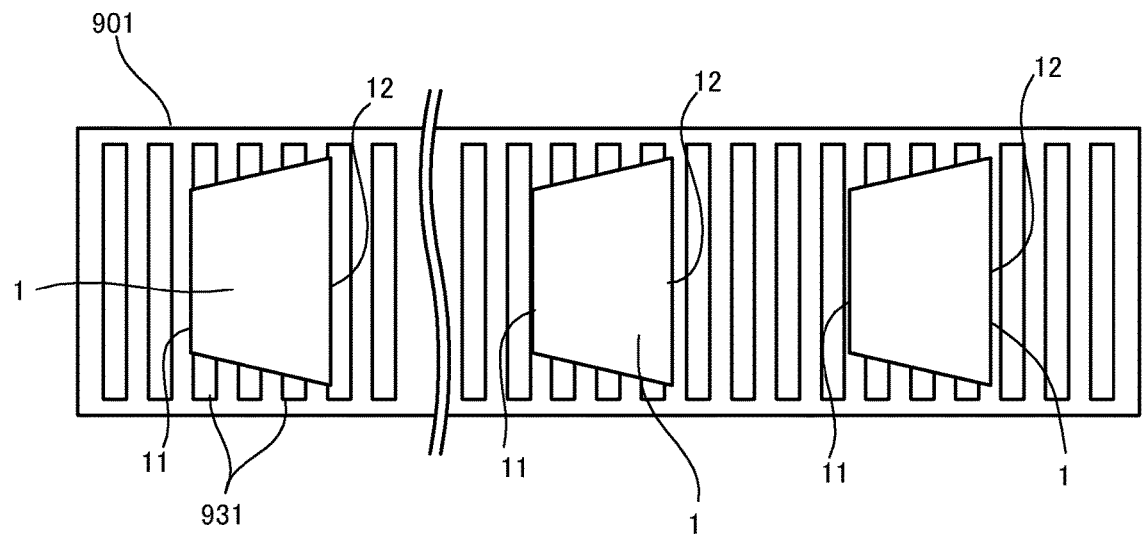
FIG. 10 is a schematic plan view of a heating furnace for a glass plate.

Incidentally, the outer glass plate is formed into a wedge shape, and therefore heating is performed in the heating furnace 901 as described below. That is, as shown in FIG. 10, in the heating furnace, the outer glass plate 1 is moved in a direction orthogonal to the direction in which the upper side 11 and the lower side 12 extend. The temperature of the lower side 12 of the outer glass plate 1 is made higher than the temperature of the upper side 11 of the outer glass plate 1. Various methods can be used to adjust the temperature as described above. For example, it is possible to employ a method in which a plurality of additional heaters are provided along the direction in which the glass plate passes through the heating furnace, only the lower side of the glass plate that is being conveyed is heated by the additional heaters, and the heaters are switched OFF (or output is reduced) when the upper side of the glass plate passes to keep the upper side from being heated. However, another method can be appropriately employed as long as a heating temperature of the lower side can be increased. After the glass plate is heated as described above, press molding and annealing are performed as shown in FIG. 9.

Note that such heating is not performed on the inner glass plate that has a constant thickness, and the entire inner glass plate is substantially uniformly heated.

After the outer glass plate 1 and the inner glass plate 2 are molded as described above, subsequently, the intermediate film 3 is sandwiched between the outer glass plate 1 and the inner glass plate 2. The intermediate film 3 is made slightly larger than the outer glass plate 1 and the inner glass plate 2. Therefore, the outer edge of the interlayer 3 protrudes from the outer glass plate 1 and the inner glass plate 2.

Next, the resultant laminate including the glass plates 1 and 2 and the intermediate film 3 is placed into a rubber bag and preliminarily bonded together at about 70 to 110° C. under vacuum suction. Preliminary bonding can be performed using another method, and the following method can also be employed. For example, the above-described laminate is heated at 45 to 65° C. in an oven. Next, this laminate is pressed by a roller at 0.45 to 0.55 MPa. Subsequently, this laminate is again heated at 80 to 105° C. in an oven and thereafter again pressed by a roller at 0.45 to 0.55 MPa. Thus, preliminary bonding is finished.

Next, permanent bonding is performed. The preliminarily bonded laminate is permanently bonded using an autoclave at a pressure of 8 to 15 atmospheres and at 100 to 150° C., for example. Specifically, permanent bonding can be performed under the conditions of a pressure of 14 atmospheres and 135° C., for example. Through the above-described preliminary boding and permanent bonding, the intermediate film 3 is bonded to the glass plates 1 and 2. Finally, a portion of the intermediate film 3 protruding from the outer glass plate 1 and the inner glass plate 2 is cut to finish the windshield. Note that another method such as curve formation using self-weight can also be performed.

7. Head-Up Display Device

Next, the head-up display device will be described. The head-up display device (hereinafter referred to as a "HUD" device) projects information such as the vehicle speed to the windshield. However, it is known that when the HUD device is used, a double image is formed by light projected to the windshield. That is, an image that is seen as a result of reflection from an inner surface of the windshield is seen separately from an image that is seen as a result of reflection from an outer surface of the windshield, and therefore an image is duplicated.

Figure 11:
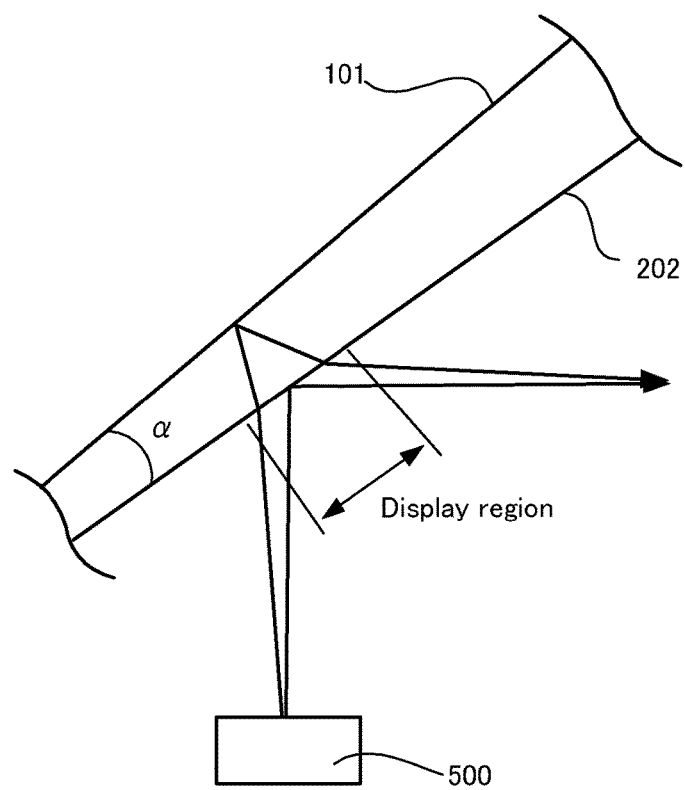
FIG. 11 is a schematic diagram showing a head-up display device.

In order to prevent this, a windshield that includes a wedge-shaped outer glass plate 1, such as that in the present embodiment, is used. That is, at least a display region of the windshield to which light is projected by a HUD device 500 is formed such that the thickness decreases downward as shown in FIG. 11. As a result, light that is reflected off the inner surface of the windshield (the second surface 202 of the inner glass plate 2) and then enters the inside of the vehicle and light that is reflected off the outer surface of the windshield (the first surface 101 of the outer glass plate 1) and then enters the inside of the vehicle mostly match and the problem of generation of a double image is resolved. Note that in this case, a wedge angle α of the windshield 1, i.e., an angle between the first surface 101 of the outer glass plate 1 and the second surface 101 can be set to 0.01 to 0.04° (0.2 to 0.7 mrad), for example, although the wedge angle is set depending on the installation angle of the windshield 1.

8. Characteristics

With the windshield according to the present embodiment, the following effects can be achieved.

(1) The inventor of the present invention found that if a wedge-shaped glass plate such as the outer glass plate 1 is uniformly heated and then press-molded, the following problem occurs. That is, the lower side of the outer glass plate 1 is thin, and therefore, when the glass plate 1 is conveyed out of the heating furnace 901 and cooled, an inner portion of the glass plate 1 easily cools similarly to its surface, and consequently, a temperature difference between the surface and the inner portion becomes small. On the other hand, the upper side 11 of the glass plate 1 is thick, and therefore, when the glass plate 1 is conveyed out of the heating furnace and cooled, the surface of the glass plate 1 more easily cools than its inner portion, and consequently, a temperature difference between the surface and the inner portion becomes large.

It is thought that if press-molding is performed in a state in which there are temperature differences as described above, a surface compressive stress on the lower side 12 of the outer glass plate 1 becomes smaller than that on the upper side 11. That is, the inventor of the present invention found that the strength may be reduced on the lower side 12 of the outer glass plate 1 due to the small thickness and the low surface compressive stress.

Therefore, in the present embodiment, the temperature of the lower side 12 of the outer glass plate 1 is increased in the heating furnace 901 as shown in FIG. 10. As a result, a heat capacity of the lower side 12 is increased, and when the glass plate 1 is conveyed out of the heating furnace 901 and cooled, the surface of the glass plate 1 more easily cools than the inner portion even if the thickness is small. A sa result, the temperature difference between the surface and the inner portion can be increased and the surface compressive stress can be increased. Accordingly, even if the thickness of the lower side 12 of the outer glass plate 1 is small, the strength can be increased as a result of the surface compressive stress being increased. That is, the surface compressive stress on the lower side 12 of the outer glass plate 1 can be increased even if tempering treatment such as air-quench tempering is not performed.

Note that the surface compressive stress on the upper side 11 can be set to 4 to 6 MPa, for example, and the surface compressive stress on the lower side 12 can be set to 5 to 7 MPa, for example. If the surface compressive stress is lower than the lower limit values, the strength of the glass plate may be reduced. On the other hand, with regard to the upper limit values, there is a method for further toughening the glass plate by increasing the inside temperature of the furnace from the viewpoint of strength, but if the surface compressive stress is too high, there is a risk of the occurrence of distortion. Furthermore, there is the following problem. That is, the accuracy of dimensions of the outer glass plate 1 does not necessarily match the accuracy of dimensions of the inner glass plate 2 before the intermediate film 3 is sandwiched, and the intermediate film 3 is sandwiched in a state in which tensile stress or compressive stress is acting on either of the outer glass plate 1 and the inner glass plate 2. At this time, if a large surface compressive stress is applied before lamination, the glass plate may break during lamination or an allowable value that can be applied without breaking the glass plate becomes small, and therefore an excessively large surface compressive stress is inappropriate. Therefore, the above-described upper limit values are preferable.

(2) In the above-described embodiment, outer surfaces of the windshield are constituted by bottom surfaces on which small irregularities are formed with lines. That is, both of the two outer surfaces of the windshield have small irregularities, and therefore perspective distortion, which occurs when an object on the outside of the vehicle is seen from the inside of the vehicle via the windshield, can be suppressed.

(3) In the above-described embodiment, the glass plates 1 and 2 are arranged such that the lines 150 on the outer glass plate 1 are orthogonal to the lines 250 on the inner glass plate 2. In contrast, if the lines 150 and 250 on the glass plates 1 and 2 extend in the same direction, variation in the thickness of the entire windshield may be increased by the combination of the lines on the vehicle exterior side surface of the windshield and the lines on the vehicle exterior side surface of the windshield. This may increase perspective distortion. Therefore, in the present embodiment, the glass plates 1 and 2 are arranged such that the lines 150 are orthogonal to the lines 250, and therefore, irregularities can be kept from being enlarged and perspective distortion can be suppressed.

9. Variations

Although one embodiment of the present invention has been described, the present invention is not limited to the above embodiment, and various alterations can be made without departing from the gist of the present invention. Also, the following variations can be appropriately combined.

9-1.

In the above-described embodiment, a heating furnace other than the heating furnace 901 shown in FIGS. 9 and 10 may also be used. That is, the heating furnace is only required to be capable of making the temperature of the lower side 12 higher than the temperature of the upper side 11. For example, as well as increasing the temperature of the lower side 12, it is also possible to set temperature distribution in the heating furnace such that the temperature increases from the upper side 11 toward the lower side 12.

9-2.

It is also possible to perform air-quench tempering on only the lower side 12 of the outer glass plate 1. For example, it is possible to substantially uniformly heat the entire outer glass plate 1 in the heating furnace 901, and blow air only toward the lower side 12 after pressing to reduce the surface temperature. Thus, the temperature difference between the surface and the inner portion on the lower side 12 can be increased to increase the surface compressive stress.

9-3.

While perspective distortion can be suppressed if bottom surfaces constitute the outer surfaces of the windshield as described above, it is advantageous to layer the shield layer 4 made of ceramic on a bottom surface. Therefore, which surfaces are arranged so as to face each other can be determined depending on the use. That is, other than the above-described arrangement in which top surfaces of the outer glass plate 1 and the inner glass plate 2 face each other, it is also possible to employ an arrangement in which the bottom surfaces face each other. Alternatively, a top surface and a bottom surface can also be arranged so as to face each other. Also, the bottom surfaces are suitable for layering an antenna element made of copper or silver through printing or the like, as well as the shield layer 4. Note that with regard to silver, if silver is applied to a bottom surface having a high concentration of tin oxide, the degree of color development achieved with tin and silver is high.

9-4.

In the above-described embodiment, the inner glass plate 2 is constituted by a flat plate, but the inner glass plate 2 can also be formed into a wedge shape similarly to the outer glass plate 1. In this case, the wedge angle of the windshield is the sum of wedge angles of the glass plates 1 and 2, and accordingly, the wedge angles of the glass plates 1 and 2 can be reduced. This facilitates formation of the glass plates.

If the inner glass plate 2 is formed into a wedge shape, the inner glass plate 2 can be formed such that the surface compressive stress on the lower side 12 is increased, similarly to the outer glass plate 1.

9-5.

In the above-described embodiment, the outer glass plate 1 and the inner glass plate 2 are arranged such that lines on the respective glass plates are orthogonal to each other, but the glass plates can also be arranged such that the lines on the respective glass plates are parallel to each other.

9-6.

There is no particular limitation on the shape of the shield layer 4, and the shield layer 4 can have various shapes. For example, a shield layer that includes a window portion may also be formed so that light can be emitted from a sensor or the outside can be captured using a camera.

9-7.

There is no particular limitation on the method for forming the outer glass plate 1 and the inner glass plate 2 into a wedge shape, and a method other than the above-described method can also be employed.

LIST OF REFERENCE NUMERALS

1 Outer glass plate (first glass plate)
2 Inner glass plate (second glass plate)
3 Intermediate film

The invention claimed is:

1. A windshield comprising:
a first glass plate that includes a first surface and a second surface;
a second glass plate that includes a first surface and a second surface and is arranged such that the first surface of the second glass plate faces the second surface of the first glass plate; and
an intermediate film that is sandwiched between the first glass plate and the second glass plate,
wherein the first glass plate includes a first end portion and a second end portion that is opposite to the first end portion, and a thickness of the first glass plate decreases from the first end portion toward the second end portion, and
in the first glass plate, a surface compressive stress on the second end portion side is higher than a surface compressive stress on the first end portion side.

2. The windshield according to claim 1,
wherein the second glass plate is constituted by a flat plate that has a substantially constant thickness.

3. The windshield according to claim 1,
wherein, in each of the first glass plate and the second glass plate, a concentration of tin oxide contained in the first surface differs from a concentration of tin oxide contained in the second surface,
a surface of the first glass plate that has a lower concentration of tin oxide constitutes the second surface, and
a surface of the second glass plate that has a lower concentration of tin oxide constitutes the first surface.

4. The windshield according to claim 1,
wherein at least one of a shield layer and an antenna is layered on the second surface of the second glass plate.

5. The windshield according to claim 1,
wherein lines are formed on the first glass plate, and
lines that are orthogonal to the lines on the first glass plate are formed on the second glass plate.

6. The windshield according to claim 1,
wherein, in each of the first glass plate and the second glass plate, a concentration of tin oxide contained in the first surface differs from a concentration of tin oxide contained in the second surface,
a surface of the first glass plate that has a lower concentration of tin oxide constitutes the second surface, and
a surface of the second glass plate that has a higher concentration of tin oxide constitutes the first surface.

7. The windshield according to claim 1,
wherein the second glass plate includes a first end portion and a second end portion that respectively correspond to the first end portion and the second end portion of the first glass plate, and
a thickness of the second glass plate decreases from the first end portion toward the second end portion.

8. The windshield according to claim 1,
wherein the first glass plate is not subjected to air-quench tempering.

9. A method for manufacturing a windshield according to claim 1 comprising:
forming a first glass plate that has a curved shape and includes a first end portion and a second end portion that is opposite to the first end portion, a thickness of the first glass plate decreasing from the first end portion toward the second end portion;
forming a second glass plate that has a curved shape; and
arranging an intermediate film between a second surface of the first glass plate and a first surface of the second glass plate and applying a pressure to form the glass plates and the intermediate film into a single piece,
wherein, in the forming of the first glass plate, the first glass plate is formed into the curved shape after being heated such that the second end portion side has a higher temperature than the first end portion side.

10. A method for manufacturing a windshield according to claim 1 comprising:
forming a first glass plate that has a curved shape and includes a first end portion and a second end portion that is opposite to the first end portion, a thickness of the first glass plate decreasing from the first end portion toward the second end portion;
forming a second glass plate that has a curved shape; and
arranging an intermediate film between a second surface of the first glass plate and a first surface of the second glass plate and applying a pressure to form the glass plates and the intermediate film into a single piece,
wherein, in the forming of the first glass plate, air-quench tempering is performed on the second end portion side.

* * * * *